US012743553B2

(12) United States Patent
Agrawal et al.

(10) Patent No.: US 12,743,553 B2
(45) Date of Patent: Sep. 22, 2026

(54) PRIVACY MANAGEMENT OMITTING REFERENCES ABOUT NON-CONSENTING PARTICIPANT'S SPEECH IN RECORDED CONVERSATIONS

(71) Applicant: MOTOROLA MOBILITY LLC, Wilmington, DE (US)

(72) Inventors: Amit Kumar Agrawal, Bangalore (IN); Nakul Patel, Nagpur (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 79 days.

(21) Appl. No.: 18/981,905

(22) Filed: Dec. 16, 2024

(65) Prior Publication Data

US 2026/0170176 A1 Jun. 18, 2026

(51) Int. Cl.

*G06F 21/62* (2013.01)
*G06V 40/16* (2022.01)
*G10L 17/02* (2013.01)
*G10L 17/22* (2013.01)
*G10L 25/57* (2013.01)
*G06F 3/0484* (2022.01)

(52) U.S. Cl.

CPC ........ *G06F 21/6254* (2013.01); *G06V 40/171* (2022.01); *G10L 17/02* (2013.01); *G10L 17/22* (2013.01); *G10L 25/57* (2013.01); *G06F 3/0484* (2013.01)

(58) Field of Classification Search

CPC . G06F 21/6254; G06F 16/345; G10L 15/183; G10L 15/22; G06N 20/00; H04L 12/1831
See application file for complete search history.

(56) References Cited

U.S. PATENT DOCUMENTS

2021/0160242 A1* 5/2021 McKnight ............. H04L 63/102
2022/0021551 A1* 1/2022 Trim ................... H04L 12/1818
2023/0308304 A1* 9/2023 Loftus ................. H04L 12/1822
2023/0352056 A1* 11/2023 Bhupati .................. H04L 65/60
2023/0353406 A1* 11/2023 Hannun .................. G06F 40/58
2023/0353704 A1* 11/2023 Springer ............... H04L 65/401

* cited by examiner

*Primary Examiner* — Hee Soo Kim
(74) *Attorney, Agent, or Firm* — Isidore PLLC

(57) ABSTRACT

A method provides techniques for omitting references about non-consenting participant's speech in recorded conversations. Audio/video (AV) data for a meeting including multiple participants is captured. Each of the participants is identified. A recording consent setting for each participant is identified. A determination is made that at least one participant has a recording consent setting of do-not-record (DNR), and at least one participant has a recording consent setting of OK-to-record (O2R). Contextual references uttered by an O2R participant that refer to phrases or sentiments spoken by a DNR participant are identified, and a redacted meeting recording is created that excludes spoken content and the contextual reference to the spoken content of non-consenting participants.

20 Claims, 11 Drawing Sheets

PRIVACY MANAGEMENT OMITTING REFERENCES ABOUT NON-CONSENTING PARTICIPANT'S SPEECH IN RECORDED CONVERSATIONS

BACKGROUND

1. Technical Field

The present disclosure generally relates to electronic devices utilized for communicating via multi-device audio/video conferencing, and more specifically to recording of meetings via electronic devices during audio/video conferencing.

2. Description of the Related Art

Online/virtual meetings play a crucial role in ensuring productivity and collaboration, especially when leveraging conference systems such as Microsoft Teams, Webex, Zoom, or similar platforms. Additionally, these conference systems enable collaboration with team members from different locations, enabling businesses to work across time zones and continents. Additionally, virtual meetings reduce the need for travel, saving time and money while still maintaining face-to-face interaction. Thus, virtual meetings are essential for modern work environments, enabling teams to collaborate, make decisions, and maintain connections regardless of physical location. When compared to asynchronous methods such as email, virtual meetings enable instant communication, reducing delays in decision-making. Furthermore, voice, video, and screen sharing allow participants to convey tone, emotion, and visual aids, minimizing misunderstandings.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
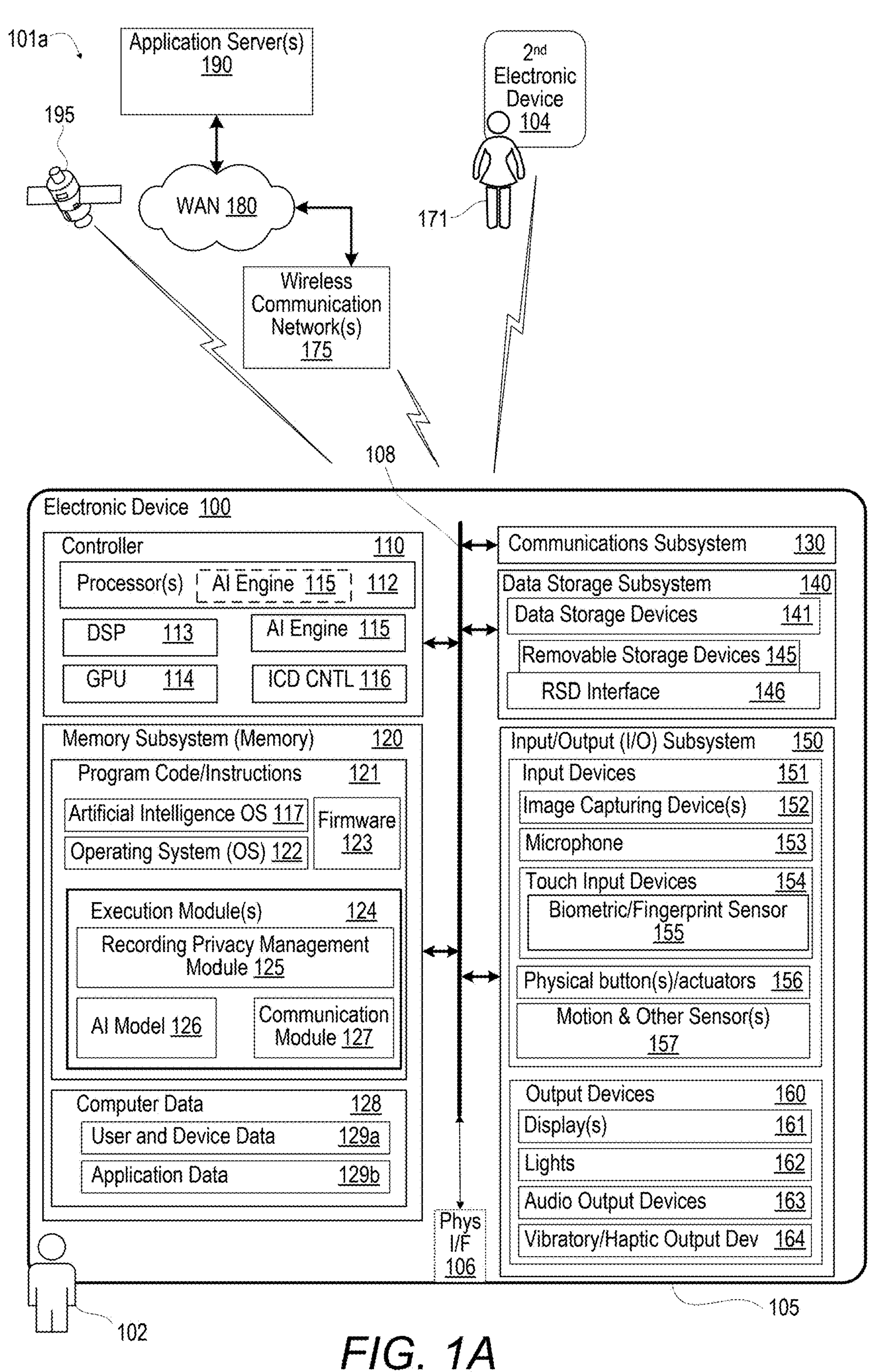
FIG. 1A presents a functional block diagram of example components of an electronic device in a communication environment and having hardware and software components that enable the features of the present disclosure to be advantageously implemented, according to one or more embodiments.

According to aspects of the present disclosure, an electronic device, a method, and a computer program product provide techniques for protecting the privacy of meeting participants that opt out of being recorded. Opting out of being recorded in a meeting, such as on Teams or Zoom, is a complex issue that touches on privacy, consent, and the practicalities of modern communication. Even if a person chooses not to be recorded, he/she might still be identifiable through contextual clues in the dialog of others, creating a paradox in which opting out doesn't guarantee full privacy.

For the purposes of this disclosure, a person who opts out of being recorded for a meeting is referred to as a do-not-record (DNR) participant. While words spoken by a DNR participant may not appear directly in the recording, colleagues mentioning the name of the DNR participant, referencing contributions of the DNR participant, and/or indirectly alluding to actions or ideas of the DNR participant could effectively identify the verbally spoken contributions of the DNR participant. Moreover, another challenge is that while many jurisdictions have consent laws for recording, often times, these laws do not address the nuances of indirect identification of statements made by a DNR participant through context clues. For the purposes of this disclosure, a person who does not opt out of being recorded for a meeting is referred to as an OK-to-record (O2R) participant.

The disclosed embodiments address the aforementioned issues by identifying recording consent settings for each participant of a meeting and obfuscating or redacting contextual references to speech uttered by non-consenting (DNR) participants. The obfuscation and/or redaction can be applied to video recordings, audio recordings and/or transcripts. The obfuscation can include blacking out, blurring, or otherwise masking image data, distorting audio data to make voices unrecognizable, and/or redacting and/or editing transcript data to obfuscate contextual references that could identify phrases and/or paraphrased content spoken by DNR participants. The contextual references can include phrases and/or sentences uttered by one participant that could potentially identify phrases spoken by another participant.

According to one aspect, conversation from a multi-participant meeting is monitored. One or more DNR participants in the meeting are identified. In one or more embodiments, the dialog is monitored by a machine learning system that performs natural language processing (NLP) on the conversation from the meeting, to identify contextual references that refer to phrases spoken by DNR participants, which could provide an indication of what the DNR participant actually said, even though the DNR participant speech was not recorded and/or has been removed from the recorded conversation. When such contextual references are identified, they can be automatically redacted, automatically obfuscated, and/or handled in a manner of via action which a user (such as a meeting administrator, and/or a DNR participant) has manually selected to be taken in response to identifying contextual references that refer to DNR participants.

One or more embodiments can provide an electronic device that includes: a communications subsystem enabling the electronic device to communicatively connect to at least one second electronic device; a memory having stored thereon a recording privacy management (RPM) module; and at least one processor coupled to the communications subsystem and the memory and which processes program code of the RPM module, the at least one processor configured to cause the electronic device to: capture audio/video (AV) data for a meeting comprising a plurality of participants; identify each participant of the plurality of participants; identify a recording consent setting for each participant among the plurality of participants; determine that at least a first participant from the plurality of participants is a non-consenting participant having a consent setting of do-not-record (DNR), and that a second participant from the plurality of participants has a consent setting of OK-to-record (O2R); identify, from within captured AV data, a contextual reference issued by the second participant, wherein the contextual reference identifies spoken content of the non-consenting participant; and create a redacted meeting recording from the captured AV data that excludes both the spoken content and the contextual reference to the spoken content of the non-consenting participant.

One or more embodiments can provide a method that includes: capturing, on an electronic device, audio/video (AV) data for a meeting comprising a plurality of participants; identifying each participant of the plurality of participants; identifying a recording consent setting for each participant among the plurality of participants; determining that at a first participant from the plurality of participants is a non-consenting participant having a consent setting of do-not-record (DNR), and that a second participant from the plurality of participants has a consent setting of OK-to-record (O2R); identifying, from within captured AV data, a contextual reference issued by the second participant, wherein the contextual reference identifies spoken content of the non-consenting participant; and creating a redacted meeting recording from the captured AV data that excludes both the spoken content and the contextual reference to the spoken content of the non-consenting participant.

Further embodiments can provide a computer program product including: a non-transitory computer readable medium; and program code on the computer readable medium that when processed by a processor of an electronic device configures the processor to perform functions of the above-described method.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, and configuring the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", "some embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1A-1B) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure. Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1A, there is illustrated a block diagram of an example electronic device 100 in communication environment 101*a* and having hardware and software components, which enable the features of the present disclosure to be advantageously implemented, according to one or more embodiments. Electronic device 100 can be configured to omit references about non-consenting participant speech in recorded conversations, such as with virtual meetings that utilize a conference system.

Examples of electronic device 100 can include, but are not limited to, mobile devices, a notebook computer, a mobile phone, a smart phone, a digital camera with enhanced processing capabilities, a smart watch, a tablet computer, and other types of electronic devices. For purposes of this disclosure, electronic device is assumed to be a communication device that can be used to engage in a voice and/or video call with a second communication device. Electronic device 100 can therefore be interchangeably referred to herein as communication device 100.

Electronic device 100 generally includes controller 110, memory (or memory subsystem) 120, communication subsystem 130, data storage subsystem 140, input/output subsystem 150, all contained within or extended from an exterior surface of device housing 105. Controller 110 is shown communicatively connected/coupled via system interlink 108 with each of the subsystems 120, 130, 140, and 150, and is directly or indirectly connected with the individual components within each subsystem 120, 130, 140, and 150. System interlink 108 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components.

Controller 110 includes processor 112, which includes one or more central processing units (CPUs) or data processors. Processor 112 performs many of the features of controller 110 and references to features performed by controller 110 can be interchangeably referred to herein as features of processor 112, and vice-versa. In some embodiments, the various functions associated with controller 110 are integrated into processor 112, and accordingly, references made herein to controller and/or processor are understood to refer to one or both components as providing a single management component within the electronic device 100. For simplicity in describing the features of the electronic device 100, the operational functions provided by one or more of operational components within controller 110, including those provided by processor 112 are collectively described as being performed by controller 110. Collectively, components integrated within controller 110 support computing, classifying, processing, transmitting and receiving of data and information, and presenting of graphical and photographic images within a display.

As illustrated, controller 110 can also include one or more digital signal processors 113, graphics processing units (GPUs) 114, artificial intelligence (AI) engine 115, and image capturing device (ICD) controller 116. In some embodiments, the functionality of each of these additional processing components can be integrated with processor(s) 112. For example, processor 112 can, in some embodiments, include dedicated AI engine 115 and image signal processors (ISPs) (not shown). Processor 112 can further include other processors such as auxiliary processor(s) that may act as a low power consumption, always-on sensor hub for physical sensors.

Controller 110 manages, and in some instances directly controls, the various functions and/or operations of electronic device 100. These functions and/or operations include, but are not limited to including, application data processing, communication, location and navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic. Controller 110 can, in some embodiments, also include a hardware acceleration (HA) unit, which can establish direct memory access (DMA) sessions to route network traffic to various elements within electronic device 100 without direct involvement from processor 112 and/or a device operating system 122. Operating system 122 may include or be augmented by device AI operating system (OS) 117 that can include native support for AI-specific hardware such as Neural Processing Units (NPUs) or Tensor Processing Units (TPUs) to optimize performance for AI tasks such as machine learning inference and training.

Memory subsystem (or memory) 120 may include a combination of volatile and non-volatile memory, such as random-access memory (RAM) and read-only memory (ROM). Memory subsystem 120 stores instruction or program code 121 for execution by processor 112 to configure processor 112 (and more generally electronic device 100) to provide the operational functions and features described herein. Instructions/program code 121 (or program code 121 for short) includes instructions for an operating system (OS) 122, firmware 123, such as basic input/output system (BIOS) or Uniform Extensible Firmware Interface (UEFI). Program code 121 includes execution module(s) 124 that collectively provides the various features of the disclosure. Execution module(s) 124 include, without limitation, Recording Privacy Management (RPM) module 125, which provides the features and operating functionality of the disclosed embodiments when the corresponding program instructions of Recording Privacy Management (RPM) module 125 are processed by/within processor 112/controller 110.

Execution modules 124 further includes AI model(s) 126. In one or more embodiments, processor 112 can utilize AI models 126 to provide AI functionality of processor-integrated AI engine 115. In other embodiments, AI models 126 are directly utilized by AI engine 115. In one or more embodiments, AI model(s) 126 is integrated as a sub-module within RPM module 125 and is trained to support the AI features of RPM module 125. AI model(s) 126 may include an artificial neural network, a decision tree, a support vector machine, Hidden Markov model, linear regression, logistic regression, Bayesian networks, and so forth. AI model(s) 126 can be individually trained to perform specific tasks and can be arranged in different sets of AI models to generate different types of output. Training of AI model(s) 126 is the process by which AI models are trained to perform specific tasks or achieve certain objectives. The training involves providing the model with a large amount of data and allowing the model to learn from patterns and relationships within that data.

Each of the above-introduced module(s) and/or application(s) provides program instructions/code that are processed by processor 112 and which configures processor 112 (and/or controller 110) and/or other operational components of electronic device 100 to cause the electronic device 100 to perform specific operations and functions, as described herein. Descriptive names assigned to these modules add no functionality and are provided solely to assist in identifying the underlying features performed by processing the different modules. For example, RPM module 125 can include program instructions that cause or configure processor 112 to cause electronic device 100 to create a redacted meeting recording from the captured AV data that excludes both the spoken content and the contextual reference to the spoken content of the non-consenting (DNR) participant. Other features provided by RPM module 125 are described in further detail throughout this disclosure.

Program code 121 can further include instructions/code for other applications (not shown) providing different features of/within electronic device 100. In one or more embodiments, program code 121 may be integrated into a distinct chipset or hardware module as firmware that operates separately from other executable program code. Portions of program code 121 may be incorporated into different hardware components that operate in a distributed or collaborative manner.

Memory subsystem 120 also includes computer data 128. During execution of program code 121, processor 112 may access, use, generate, modify, store, or communicate computer data 128, such as user and device data 129*a* and application data 129*b*. Computer data 128 may incorporate "data" that originated as raw, real-world "analog" information that consists of basic facts and figures. Computer data 128 includes different forms of data, such as numerical data, images, coding, notes, and financial data, as well as data presenting video, graphics, text, and images. Computer data 128 may originate at electronic device 100 or may be retrieved from a remote device via communications subsystem 130. Electronic device 100 may store, modify, present, or transmit computer data 128.

Communications subsystem 130 includes various components that enable electronic device 100 to communicate with external communication networks and other devices, such as second electronic device 104 and application server(s) 190, etc., via communications subsystem 130. According to one or more embodiments, communication module 127 presented within program code 121 includes instructions supporting the use of communications subsystem 130 to establish communication interfaces enabling communication by electronic device 100 with these external networks and devices.

Data storage subsystem 140 of electronic device 100 includes data storage device(s) 141. Controller 110 is communicatively connected, via system interlink 108, to data storage device(s) 141. Data storage subsystem 140 provides stored versions of program code 121 and computer data 128 on nonvolatile storage that is accessible by controller 110. The program code 121 can be loaded into memory 120 for execution/processing by controller 110. In one or more embodiments, data storage device(s) 141 can include hard disk drives (HDDs), optical disk drives, and/or solid-state drives (SSDs), etc.

Data storage subsystem 140 of electronic device 100 can include removable storage device(s) (RSD(s)) 145, which is received in RSD interface 146. Controller 110 is communicatively connected to RSD 145, via system interlink 108 through RSD interface 146. In one or more embodiments, RSD 145 is a non-transitory computer program product or computer readable storage device that stores program code and associated data, including a copy of RPM module 125 and AI model(s) 126, which may be executed by a processor associated with a user device, such as electronic device 100. Controller 110 can access data storage device(s) 141 or RSD(s) 145 to provision electronic device 100 with stored program code 121 and computer data 128 that, when executed/processed by processor 112, the program code configures processor 112 and/or more generally electronic device 100, to provide the various functions described herein.

I/O subsystem 150 includes input devices 151 such as, but not limited to, image capturing device(s) (ICDs) 152, microphone 153, and touch input devices 154 (e.g., touch screens, keys, or buttons) for use by a user to interface with electronic device 100. Touch input devices 154 can include a biometric/fingerprint sensor 155 for biometric input. Biometric/fingerprint sensor 155 can be used to read/receive biometric data, such as fingerprints, to identify or authenticate a user. In some embodiments, the biometric sensor 155 can supplement an ICD (camera), which captures images for user detection/identification via facial recognition.

Input devices 151 may include physical buttons/actuators 156 that can be located on a periphery of the device housing 105. Physical buttons/actuators 156 may provide controls for volume, power, and ICDs 152. Microphone 153 can also be referred to as an audio input device. In some embodiments, microphone 153 may be used for identifying a user via voiceprint, voice recognition, and/or other suitable techniques. Input devices 151 can also include one or more motion or other sensor(s) 157, which are further defined in the FIG. 1B description which follows.

Figure 1B:
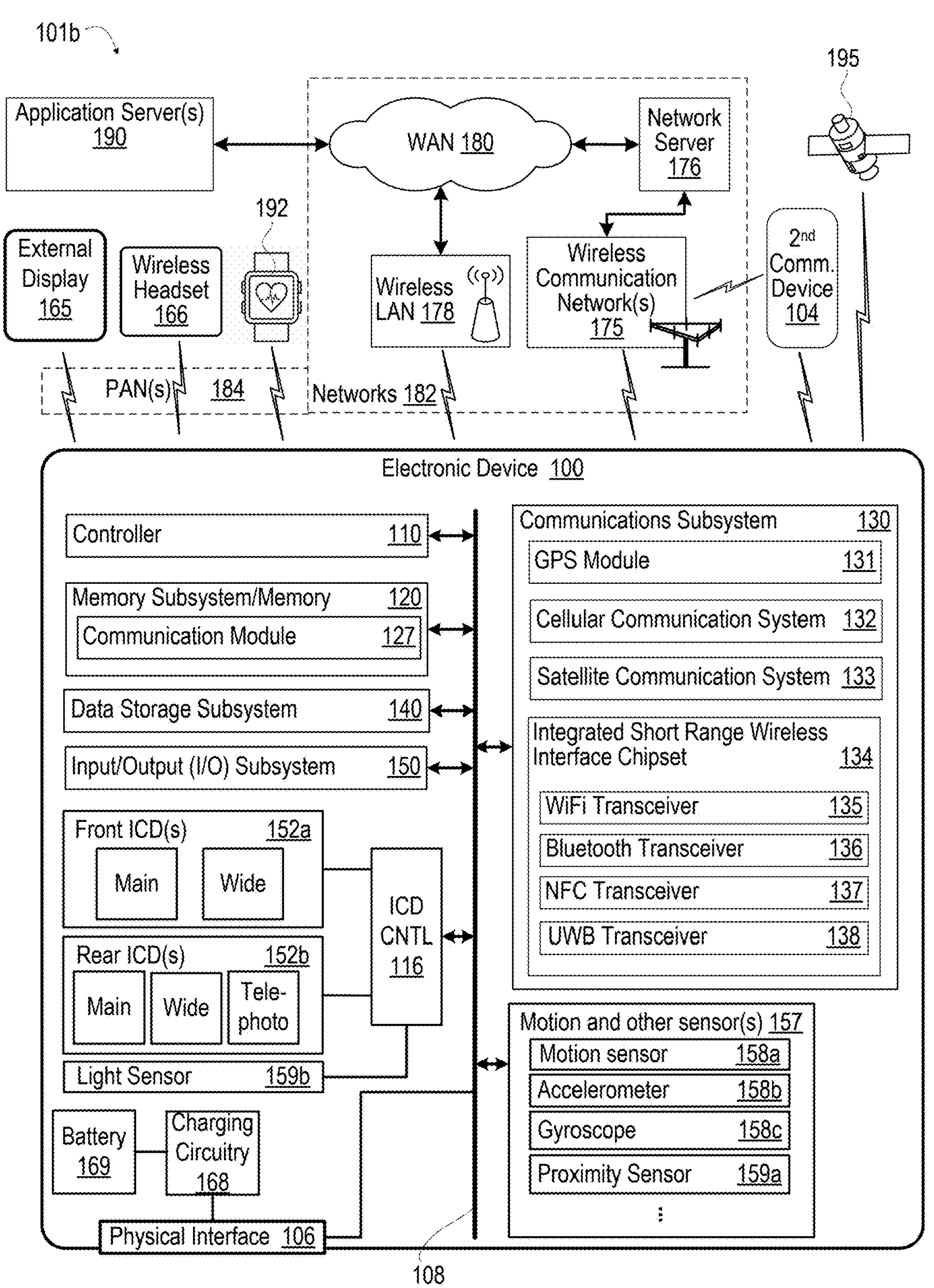
FIG. 1B is an additional block diagram representation of the electronic device of FIG. 1A presenting additional components, including components for wireless communications with other devices, according to one or more embodiments.

With reference to FIG. 1B, as illustrated, motion and other sensor(s) 157 of electronic device 100 include, but are not limited to, one or more motion sensor(s) 158*a*, one or more accelerometers 158*b*, one or more gyroscopes 158*c*, and proximity sensor 159*a*, etc. Motion sensor(s) 158*a* detect movement of electronic device 100 and provide motion data to processor 112 indicating the spatial orientation, position and movement of electronic device 100. Accelerometers 158*b* measure linear acceleration of movement of electronic device 100 in multiple axes (X, Y and Z). For example, accelerometers 158*b* can include three accelerometers, where one accelerometer measures linear acceleration in the X axis, one accelerometer measures linear acceleration in the Y axis, and one accelerometer measures linear acceleration in the Z axis. Accelerometers 158*b* can be used to calculate the orientation/position of electronic device 100 relative to the earth and can also be referred to as a gravity sensor. Gyroscope 158*c* measures rotation or angular rotational velocity of electronic device 100. Proximity sensor 159*a* senses the presence of nearby objects. In one embodiment, proximity sensor 159*a* can be an infrared (IR) sensor that detects the presence of a nearby object, such as when electronic device 100 is in a pocket of a user. Electronic device 100 can also include one or more light sensors 159*b*, which detects the luminance and/or intensity (i.e., the amount) of ambient light surrounding the electronic device 100.

Referring again to FIG. 1A, I/O subsystem 150 includes output devices 160 such as, but not limited to, display(s) 161, lights 162, audio output devices 163, and vibratory and/or haptic output devices 164. In one or more embodiments, electronic device 100 includes an integrated display 161 which incorporates a tactile, touch screen interface that can receive a user's tactile/touch input. As a touch screen device, integrated display 161 allows a user to provide input to and/or to control electronic device 100 by touching features within a user interface presented on integrated display 161. Tactile, touch input device 154 can include a touch screen interface. The touch screen interface can include one or more virtual buttons or selectable affordances. In one or more embodiments, when a user 102 applies a finger or stylus on the touch screen interface (154) in the region demarked by the virtual button, the touch of the region causes the processor 112 to execute code to implement a function associated with the virtual button. In some implementations, integrated display 161 is integrated into a front surface of electronic device housing 105 along with front image capturing devices (not specifically shown), while the higher quality ICDs are located on a rear surface of device housing 105. Other embodiments provide multiple integrated displays within electronic device 100 and references to display(s) 161 are assumed to refer to one or all of these multiple integrated displays.

Vibration/haptic output device 164 can cause electronic device 100 to vibrate or shake when activated. Vibration/haptic output device 164 can be activated during an incoming call or message in order to provide an alert or notification to a user of electronic device 100. In one or more embodiments, integrated display 161, audio output devices (or speakers) 163, and vibration/haptic device 164 can generally and collectively be referred to as output devices.

With reference again to FIG. 1B and with continuing reference to FIG. 1A, there is presented another view of electronic device 100 with components enabling electronic device 100 to function as a mobile communication device, within an expanded communication environment 101*b*. In addition to the functional and operational components already presented by and described within the description of FIG. 1A, FIG. 1B further illustrates expanded communications subsystem 130 with additional communication components and interfaces enabling electronic device 100 to perform wireless communications within an expanded communication environment 101*b* that includes other devices.

Communications subsystem 130 includes global positioning system (GPS) module 131 that enables electronic device 100 to communicate with and receive GPS location data from GPS satellite(s) 195. In one or more embodiments, GPS module 131 receives geospatial input from GPS broadcasts of time data and location data from GPS satellite(s) 195 to obtain geospatial location information about the physical location of electronic device 100.

In one or more embodiments, controller 110, via communications subsystem 130, performs multiple types of cellular over-the-air (OTA) or non-cellular wireless communication, such as by using a Bluetooth connection or other personal access network (PAN) connection. As shown, communications subsystem 130 includes cellular communication system 132, which includes at least one radio frequency RF front end coupled to one or more antennas. In one or more embodiments, cellular communication system 132 can include a communication module with one or more baseband processors or digital signal processors, one or more modems, and a radio frequency (RF) front end having one or more transmitters and one or more receivers. In one or more embodiments, controller 110, via communications subsystem 130, may communicate via an OTA cellular connection with radio access networks (RANs) over a cellular wireless communication network (CWCN) 175. CWCN 175 can be a terrestrial network and include a plurality of base stations and associated network server(s) 176, in one embodiment. Cellular communication system 132 allows electronic device 100 to communicate wirelessly with CWCN 175 via transmissions of communication signals (represented as lightning bolts) to and from network communication devices, such as base stations or cellular nodes, of CWCN 175. Alternatively, or in addition, CWCN 175 can include a satellite network, and electronic device 100 connects to CWCN 175 using satellite communication system 133. Cellular communication system 132 and satellite communication system 133 enable electronic device 100 to engage in long distance wireless communication capabilities.

In one or more embodiments, communications subsystem 130 includes integrated short range wireless interface chipset 134 having one or more of Wi-Fi transceiver (TxRX) 135, Bluetooth (BT) TxRx 136, near field communication (NFC) transceiver 137, and ultra-wideband (UWB) transceiver 138. In one or more embodiments, the short-range communication devices are not integrated on a single chipset but can be separately provided hardware components. In one or more embodiments, electronic device 100 can communicate wirelessly with external wireless devices, such as a Wi-Fi router of a wireless local area network (WLAN) 178 and/or second electronic device 104, via one or more short-range wireless interface(s). Second electronic device 104 can be a communication device, such as a smartphone, and/or can be similarly configured as electronic device 100. Second user 171 may operate second electronic device 104. In one or more embodiments, electronic device 100 can receive Internet or Wi-Fi based calls, text messages, multimedia messages, and other notifications via a combination of wireless and wired networks (generally networks 182).

In one or more embodiments, networks 182 can include CWCN 175, WLAN 178, and Wide Area Network (WAN) 180, such as the Internet. In one or more embodiments, WAN 180 can enable electronic device 100 to access application servers 190, which can provide a downloadable version of RPM module 125 and/or access to other applications, online transactions, and resources. In one or more embodiments, networks 182 can also include personal area networks (PAN) 184, which are individually created with second devices via one of short-range wireless devices from among Wi-Fi TxRX 135, BT TxRx 136, NFC transceiver 137, and UWB transceiver 138. Example second devices include external display 165, wireless headset 166, and wearable computing device 192. External display 165 can be a stand-alone monitor/display or a display integrated into a second electronic device, such as a laptop computer. In at least one embodiment, connection to the external display 165 can be wired and can include an intermediate connection device, such as a docking station device. In one or more embodiments, wearable computing device 192, such as a smartwatch, fitness tracker, or the like, may be paired with electronic device 100, and provide biometric data such as heart rate, breathing rate, and the like, to the electronic device 100 via the paired communication link.

Electronic device 100 also includes a physical interface 106. Physical interface 106 of electronic device 100 can serve as an input/output data port and can be used as a power supply port that is coupled to charging circuitry 168 which feeds electrical power to device battery 169 to enable recharging of device battery 169 and/or powering of electronic device 100. As a data port, physical interface 106 can enable electronic device 100 to be physically coupled via a cable or docking station port to a second device, such as external display 165.

FIG. 1B also presents additional details of ICD(s) 152 of electronic device 100. Throughout the disclosure, the term image capturing device (ICD) is synonymous with and/or utilized interchangeably with any one of the cameras of electronic device 100. ICD(s) (or cameras) 152 includes front cameras 152*a* and rear cameras 152*b*. In one embodiment, each of front cameras 152*a* and rear cameras 152*b* are communicatively coupled to ICD controller 116. ICD controller 116 supports the processing of image data from front cameras 152*a* and rear cameras 152*b*. Front cameras 152*a* can include a main camera and a wide-angle camera. Rear ICD(s) can include a main camera, a wide-angle camera, and a telephoto camera. Both sets of cameras 152 include image sensors that can capture images that are within the field of view (FOV) of each respective camera 152. In one or more embodiments, one or more of the cameras can be utilized to enable biometric authentication using facial image and/or iris scan recognition.

Figure 2A:
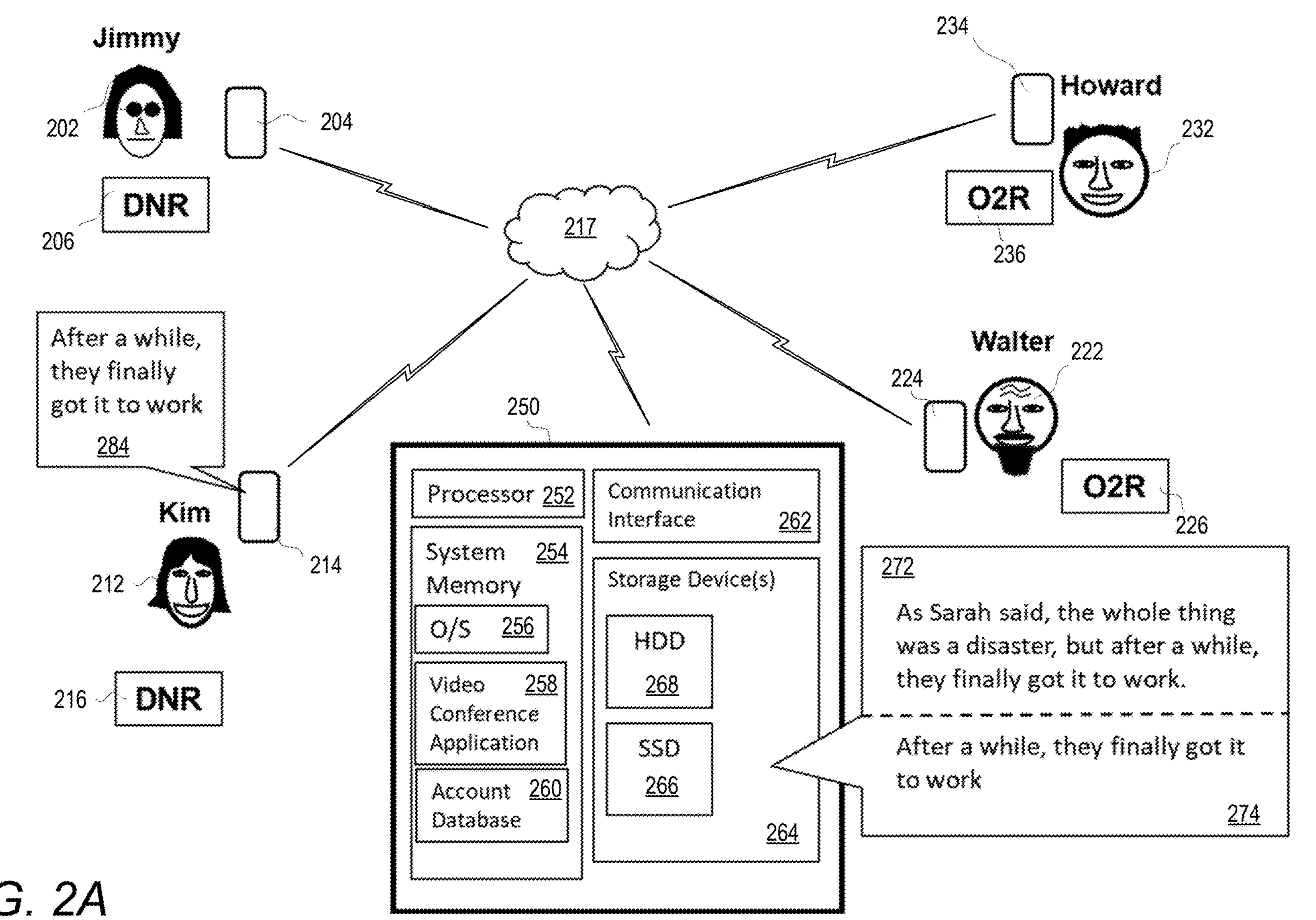
FIG. 2A illustrates an example teleconferencing environment, according to one or more embodiments.

FIG. 2A illustrates an example teleconferencing environment, according to one or more embodiments. A first participant “Jimmy” 202 has an associated electronic device 204. A second participant “Kim” 212 has an associated electronic device 214. A third participant “Walter” 222 has an associated electronic device 224. A fourth participant “Howard” 232 has an associated electronic device 234. The electronic devices 204, 214, 224, and 234 may be similar to electronic device 100 shown in FIG. 1A. Electronic devices 204, 214, 224, and 234 are communicatively connected to video conferencing server 250 via network 217 during a video communication session. In one or more embodiments, two or more of the electronic device(s) further comprise a display, a camera, and a microphone, and the capturing of AV data comprises capturing at least a portion of the AV data via the camera and the microphone during a video call. The first participant “Jimmy” 202 has a recording consent setting of do-not-record (DNR), as indicated at 206. The second participant “Kim” 212 has a recording consent setting of OK-to-record (O2R), as indicated at 226. The third participant “Walter” 232 has a recording consent setting of O2R, as indicated at 226. The fourth participant “Howard” 232 has a recording consent setting of O2R, as indicated at 236.

The video conferencing server 250 includes a processor 252. The processor 252 can include one or more cores. The processor 252 is coupled to system memory 254. System memory 254 can include a combination of volatile and non-volatile memories, such as DRAM, SRAM, Flash memory, and so on. The system memory 254 can include an operating system 256. In one or more embodiments, the operating system can include Windows, Linux, or other Unix variants. The system memory can include a video conference application 258. The video conferencing application 258 can include code, that when executed by the processor 252, performs various media processing functions such as transcoding, mixing, and encoding video and audio streams. The video conferencing application 258 can further include code, that when executed by the processor 252, performs various stream routing functions, such as directing AV streams between participants to minimize latency and ensure efficient use of bandwidth. Moreover, the code of video conferencing application 258 may provide support for implementing single sign-on (SSO), OAuth, or multi-factor authentication (MFA) for user verification. Additionally, the code of video conferencing application 258 may provide functionality for granting different levels of access to participants, such as host, co-host, presenter, or viewer. Furthermore, the code within video conferencing application 258 may provide support for recording and archiving of conferences. This can include storing video, audio, and shared content on the cloud with options for later access and editing, as well as automatically generating and storing meeting transcripts for later reference.

As an illustrative example of functionality of disclosed embodiments, as can be seen in FIG. 2A, an original transcript fragment 272 is shown, and can be stored within storage device 264 of video conferencing server 250. The original transcript fragment contains a contextual reference that could potentially identify what someone else said. In the case where Sarah is a DNR participant, the phrase “As Sarah said, the whole thing was a disaster . . . ” can potentially identify something Sarah said, even if her direct quote is not included in audio and/or transcript data. Disclosed embodiments can create a new AV data segment that contains a redacted version of the original transcript fragment. As shown at 274, the new AV data segment includes a redacted version that only includes the portion of the original transcript fragment that does not include the contextual reference that could potentially identify a phrase spoken by a DNR participant. In one or more embodiments, the original transcript and recordings, as well as the redacted transcript and recordings, may be stored on the video conferencing server 250. In one or more embodiments, the original transcript may have restricted access such that only an administrator or meeting host can access the original recording and/or transcript. In one or more embodiments, for storage on a local device storage, for security purposes, only the redacted transcript and/or recordings is stored, as indicated at 284. The video conferencing application 258 can further include code, that when executed by the processor 252, performs and/or implements one or more features of disclosed embodiments. Other features may also be supported by the code of video conferencing application 258. System memory 254 can further include an account database 260. In one or more embodiments, the database can include a relation database, such as a structured query language (SQL) database. In one or more embodiments, for each user of the video conferencing application, user credentials, profile details, and role-based permissions are stored in the account database 260.

The video conferencing server 250 may further include a communication interface 262. The communication interface 262 may include one or more ethernet, gigabit ethernet (GbE), RJ-45 ports, SFP/SFP+/QSFP interfaces for fiber optic or high-speed copper connections, Fibre Channel (FC) interfaces, and/or other suitable communication interfaces. The video conferencing server 250 may include one or more storage devices 264. The storage devices may include solid-state drives (SSDs) 266, such as SATA SSDs, and/or NVMe SSDs for storing intermediate data, and may further include one or more hard disk drives (HDDs) 268, such as enterprise-grade HDDs which may be used for archiving recorded meetings and/or storing backups of user data and/or logs.

In one or more embodiments, the meeting recording device can be one or more of the local devices such as electronic device 204, 214, 224, and/or 234. In one or more embodiments, the meeting recording device can additionally or alternatively be the video conferencing server 250.

Figure 2B:
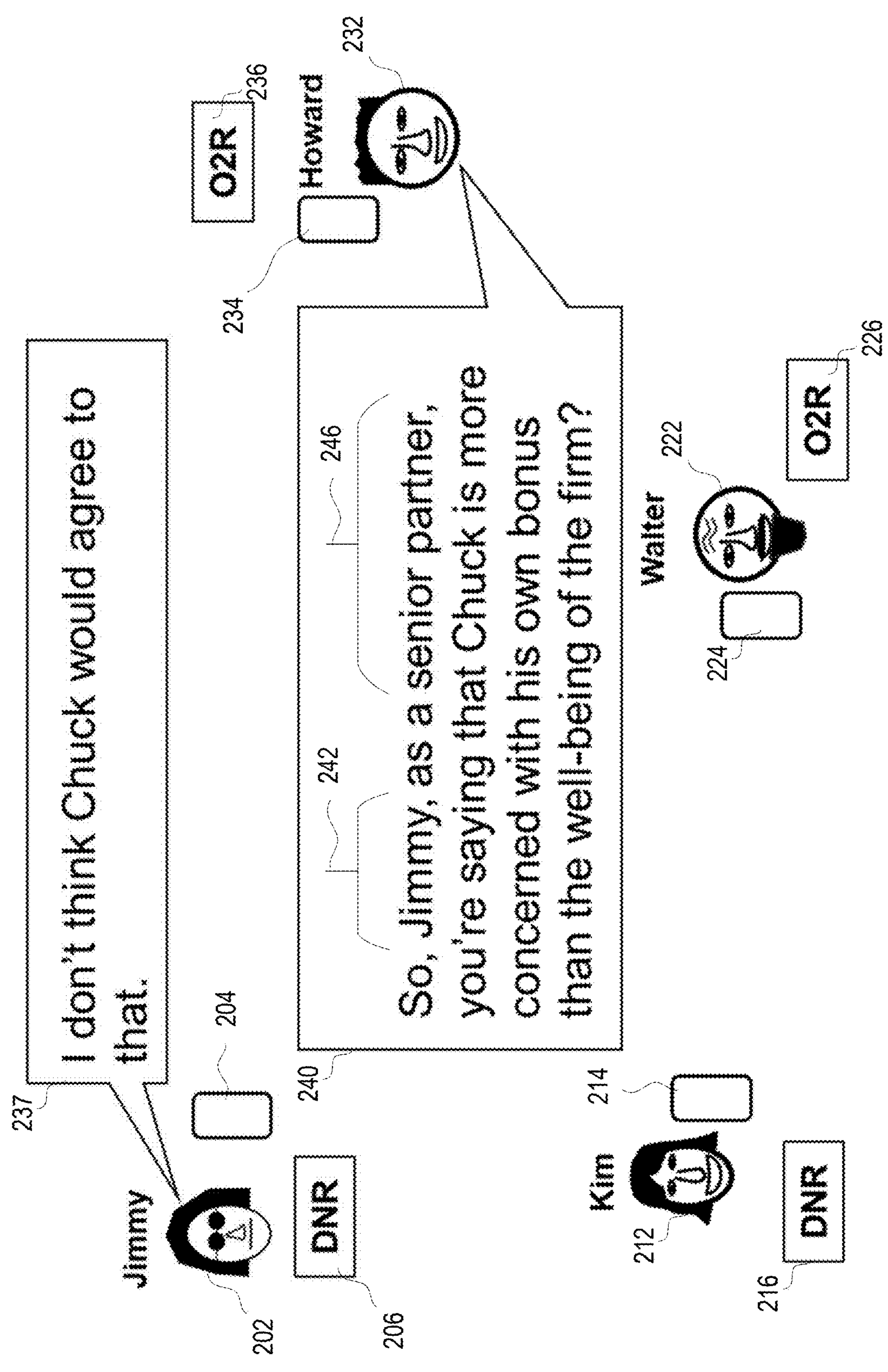
FIG. 2B illustrates an example scenario in which a reference about a non-consenting participant's speech is detected, according to one or more embodiments.

FIG. 2B illustrates an example scenario in which a reference about speech made by a non-consenting participant is detected, according to one or more embodiments. Electronic devices 204, 214, 224, and 234 are communicatively connected within an ongoing video communication session. In one or more embodiments, two or more of the electronic device(s) further comprise a display, a camera, and a microphone, and the capturing of AV data comprises capturing at least a portion of the AV data via the camera and the microphone during a video call. The first participant "Jimmy" 202 has a recording consent setting of do-not-record (DNR), as indicated at 206. The second participant "Kim" 212 has a recording consent setting of OK-to-record (O2R), as indicated at 226. The third participant "Walter" 232 has a recording consent setting of O2R, as indicated at 226. The fourth participant "Howard" 232 has a recording consent setting of O2R, as indicated at 236.

FIG. 2B further depicts a conversation in progress, in which Jimmy 202 utters a first phrase, indicated at 237, which states "I don't think Chuck would agree to that." In response to the first phrase, Howard 232 utters a second phrase, sentence 240, which states "So, Jimmy, as senior partner, you're saying that Chuck is more concerned with his own bonus than the well-being of the firm?" One or more embodiments may perform a sentiment analysis on the sentence 240. The sentiment analysis can be performed via natural language processing (NLP) techniques. The NLP techniques can determine the sentiment of the sentence as critical or accusatory. The NLP techniques can determine that sentence 240 likely questions someone's actions or motives (Chuck's concern for his bonus over the firm's well-being), implying disapproval or skepticism. The NLP techniques can also include performing entity detection in order to determine personally identifiable information, such as the proper name Jimmy, as indicated at 242. The NLP techniques can also determine roles and/or titles of participants, based on the contextual reference. The phrase "senior partner" indicated at 246 is significant as it denotes a specific position within a firm or organization. If the organization is known, the mention of the senior partner could potentially reveal things that Jimmy stated during the meeting. Since Jimmy has a recording consent setting indicated at 206 as DNR, it is important to take measures to protect the privacy of Jimmy, and any other participants with a DNR status. Moreover, the NLP techniques can determine that the sentence references bonuses and the well-being of the firm, which may relate to sensitive financial or interpersonal dynamics within the organization. Additionally, in one or more embodiments, NLP techniques can be used to perform an analysis of the sentence to identify potential conflict or criticism of a person's priorities, which could be seen as defamatory or damaging. The sentence 240 includes a non-consenting participant reference, since the sentence 240 references Jimmy, as indicated at 242, and the recording consent setting of Jimmy is set to DNR, as indicated at 206, and accordingly, one or more embodiments can prevent the non-consenting participant reference from being recorded. One or more embodiments can include: identifying a first phrase from the first participant; identifying a second phrase from the second participant; identifying an inference in the second phrase that relates to and reveals one or more aspects of the first phrase attributable to the first participant; and identifying the second phrase as a non-consenting participant reference, based on the inference. One or more embodiments can include identifying within the second phrase, at least one identifying feature of the first participant from among identifying features comprising a name of the first participant and a job title of the first participant. Other forms of identifying features, such as references to gender, color, hair color, geographical location, city, nationality, etc. can also be determined/identified.

Figure 2C:
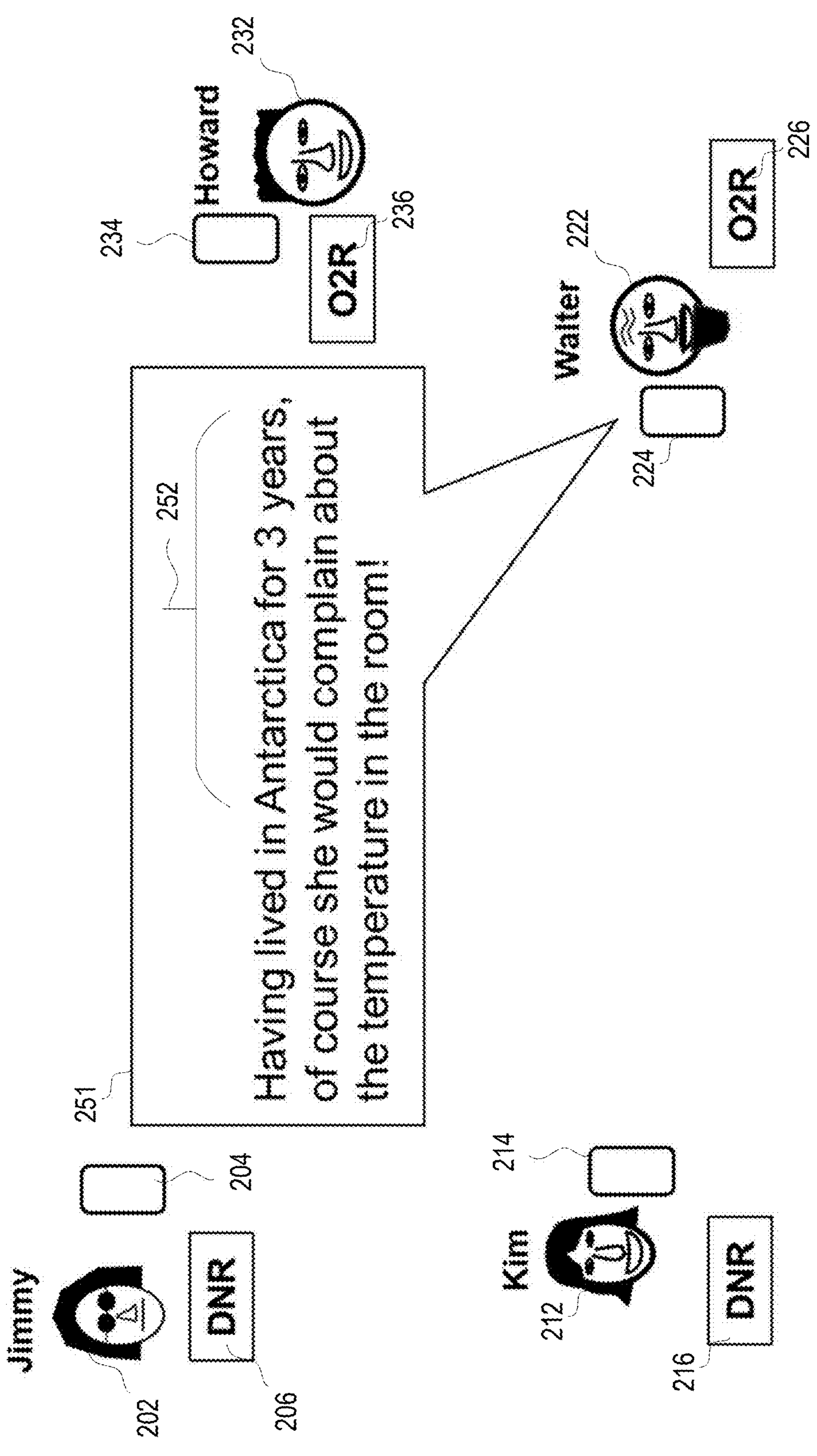
FIG. 2C illustrates another example scenario in which a reference about a non-consenting participant's speech is detected, according to one or more embodiments.

FIG. 2C illustrates another example scenario in which a reference about speech of a non-consenting participant is detected, according to one or more embodiments. In the example of FIG. 2B, participant Walter 222 utters sentence 251, which states "Having lived in *Antarctica* for 3 years, of course she would complain about the temperature in the room." Even though no person is explicitly named in sentence 251, contextual references, such as indicated at 252, referring to a location (*Antarctica*) and a time period (3 years) could be used to identify the person that Walter 222 was referring. In the scenario where Walter 222 is referring to Kim 212, then Walter is potentially revealing statements, or a paraphrasing of statements, made by another participant that has a recording status of DNR (as indicated at 216. Disclosed embodiments can accommodate the situation depicted in FIG. 2A and/or FIG. 2B using a variety of techniques, as will be further described.

Figure 3A:
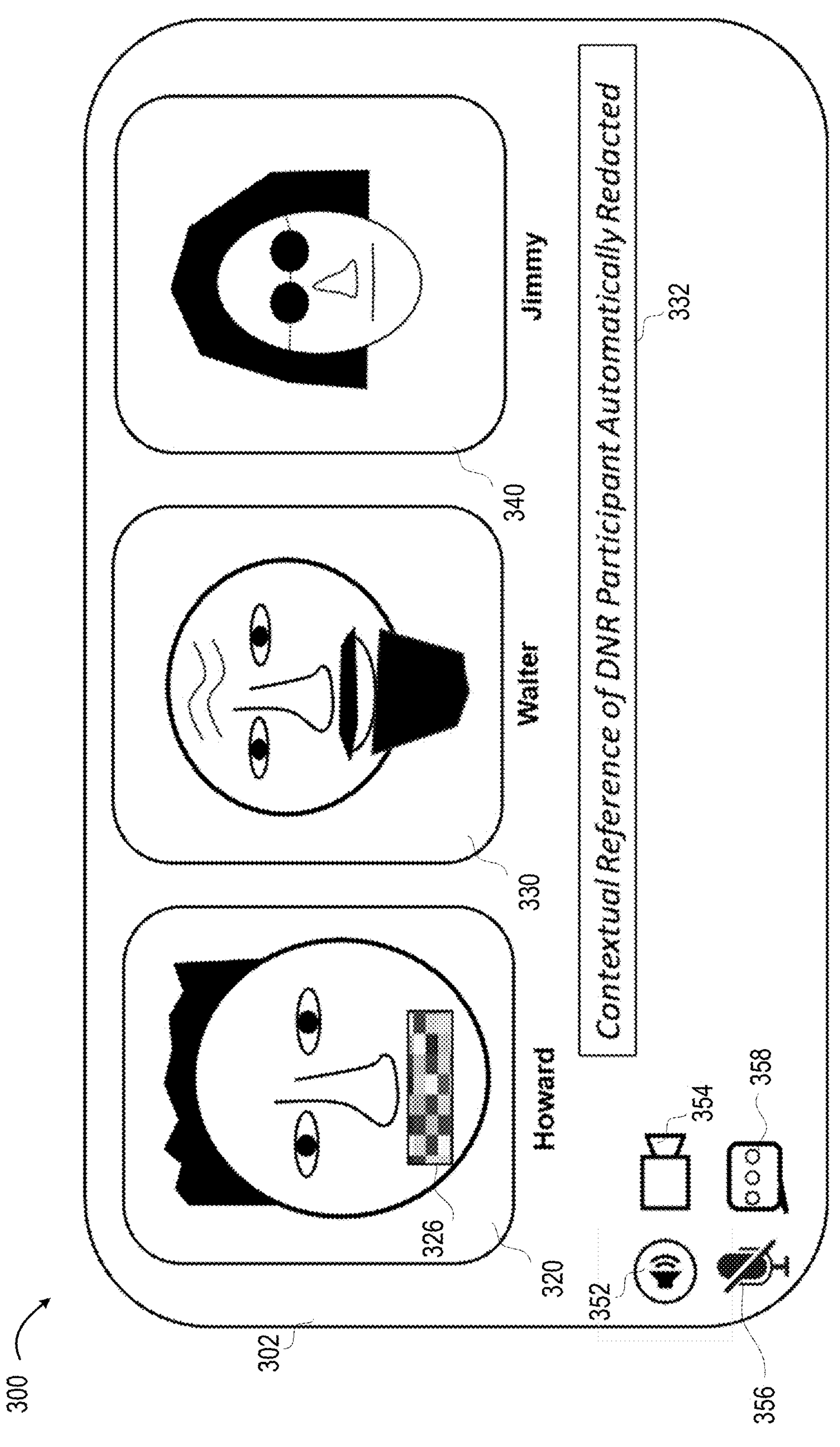
FIG. 3A illustrates an example user interface for do-not-record (DNR) participant redaction, according to one or more embodiments.

FIG. 3A illustrates an example user interface for DNR participant redaction, according to one or more embodiments. The example user interface is based on the example meeting depicted in FIG. 2A and FIG. 2B. Device 300 may be similar to electronic device 100 depicted in FIG. 1A. Device 300 includes display 302. The user interface can include functionality for implementing a virtual meeting. The user interface can include a control 352 for muting/unmuting incoming audio, a control 356 for muting/unmuting outgoing audio, a control 354 for enabling/blocking outgoing video, and a control 358 for enabling a chat function. Additional controls are possible in one or more embodiments. The user interface shown in FIG. 3A shows three participants in respective video windows. Howard is shown in window 320. Walter is shown in window 330. Jimmy is shown in window 340. Referring again to FIG. 2A, Howard 232 is uttering a sentence 240 that includes contextual references that could potentially identify Jimmy 202, whose recording consent setting is set as DNR (indicated at 206). FIG. 3A shows how that conversation may appear in a virtual meeting, with the features of the present disclosure applied. In one or more embodiment, Howard's audio can be muted during the utterance of sentence 240. Moreover, in some embodiments, his mouth and/or face can be obfuscated during the utterance via blurring or pixelation techniques, as indicated at 326. Alternatively, the video feed for Howard can be frozen while the audio is muted, or the video feed can be muted along with the audio, to prevent lip reading of a contextual reference that is being concealed. Moreover, in one or more embodiments, an indication 332 is rendered and presented on the display that indicates that a contextual reference of a DNR participant is being automatically redacted. In one or more embodiments, the indication 332 can be rendered on the display of the device associated with the DNR participant to which the contextual reference refers. One or more embodiments can include rendering and presenting a redaction notification on the display. One or more embodiments can include: identifying one or more video images within the AV data that correspond to lips of the first participant providing spoken content and lips of a second participant providing a contextual reference to the spoken content; and applying an obfuscation effect to the lips of the first participant and of the second participant in each of the one or more video images, to prevent lip-reading of the spoken content related to the contextual reference.

Figure 3B:
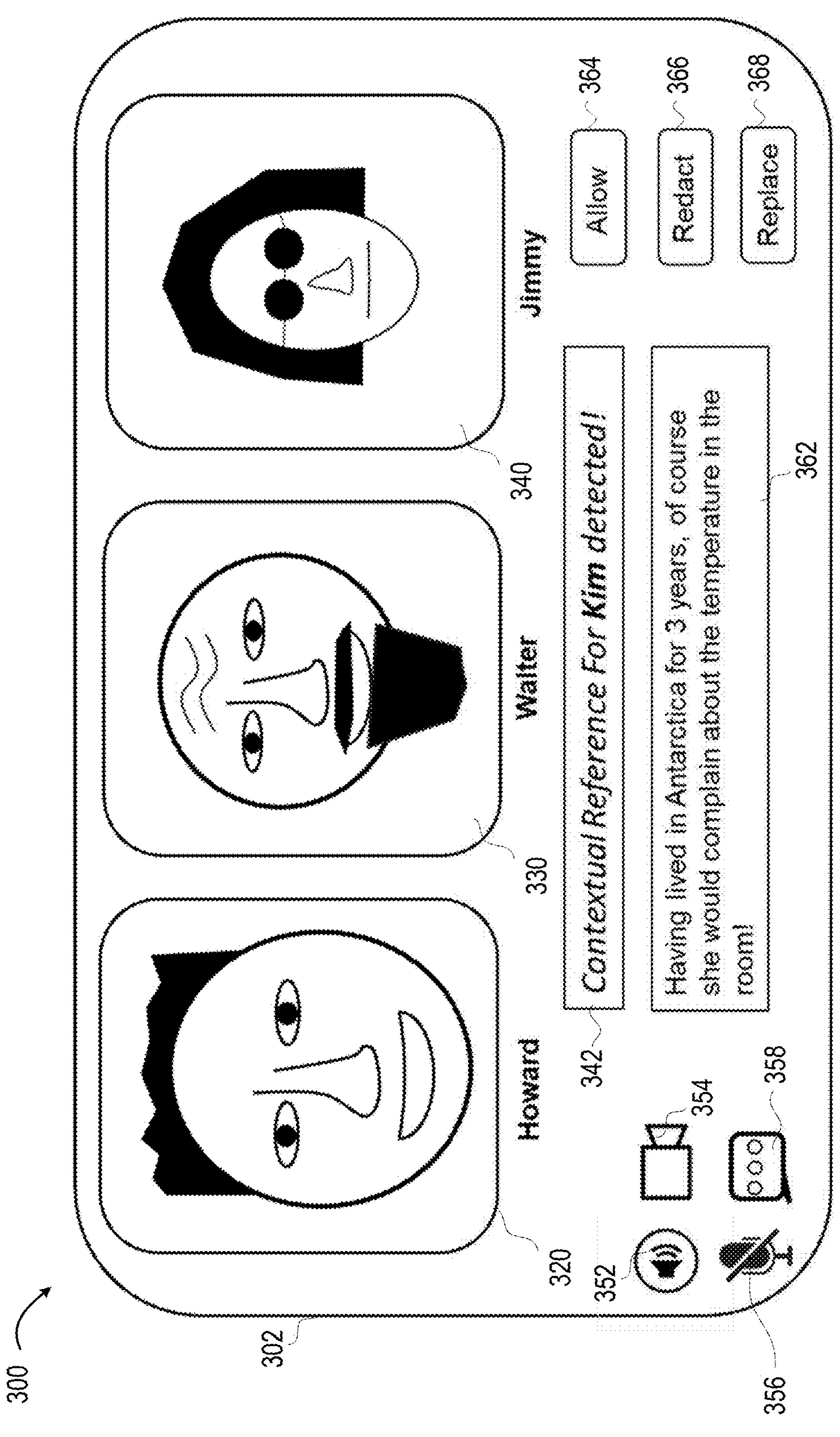
FIG. 3B illustrates an example user interface for contextual reference detection, according to one or more embodiments.

FIG. 3B illustrates an example user interface for contextual reference detection, according to one or more embodiments. The reference numbers in FIG. 3B that match corresponding reference numbers in FIG. 3A refer to similar elements. Referring again to FIG. 2B, Walter 222 is uttering a sentence 251 that could potentially identify Kim 212, whose recording consent setting is set as DNR (indicated at 216). FIG. 3B shows how that conversation may appear in a virtual meeting on Kim's device 214. An indication 342 is rendered and presented on the display 302 that indicates that a contextual reference for Kim has been detected. A text field 362 shows the phrases and/or sentences that triggered the contextual reference detection. An option 364 is presented that, when invoked, enables the user Kim 212 to allow the reference to be included in the transcript or recording of the communication exchange). Thus, the option 364 enables the DNR participant to allow a contextual reference to be recorded, if the DNR participant chooses to allow it. A next option 366 is presented that, when invoked, enables the DNR participant to redact a contextual reference that refers to them, such that the contextual reference is not included in the transcript or recording of the communication exchange. Another option 368 is presented that, when invoked, enables the DNR participant to replace a contextual reference that refers to something that the DNR participant may have said, such that the original contextual reference is not included in the transcript or recording of the communication exchange, and in place of the original contextual reference, an anonymized version of the contextual reference is generated and recorded.

According to some embodiments, the anonymized version of the contextual reference can be created via machine-learning models executing natural language processing (NLP) techniques. In this way, the overall gist of the conversation can be recorded, while specific references are omitted and replaced. In one or more embodiments, a transcript of the recording may be generated using a speech-to-text process. In one or more embodiments, the replacement contextual references may be used in the transcript, replacing the original contextual reference with the replacement (anonymized) contextual reference. In one or more embodiments, an audio recording of the conference may insert audio data corresponding to a replacement (anonymized) contextual reference in place of an original contextual reference. The inserted audio data can be a computer-generated voice. In one or more embodiments, the inserted audio data may be generated utilizing a voice cloning process, such that the replacement (anonymized) contextual reference is recorded in a voice similar to that of the person who spoke the original contextual reference that is replaced. One or more embodiments may utilize a Generative Adversarial Network (GAN), and/or autoencoder to generate the audio data that corresponds to replacement (anonymized) contextual references. One or more embodiments can include creating a transcript based on the redacted meeting recording. One or more embodiments can include performing a mitigation action in response to identifying the contextual reference, wherein the mitigation action comprises at least one of, skipping/omitting of the contextual reference, surfacing a contextual reference notification that includes an option to allow or remove the contextual reference, and creating an anonymized summary of a portion of the AV data to remove identifying aspects of the contextual reference and replacing the contextual reference with the anonymized summary.

Figure 3C:
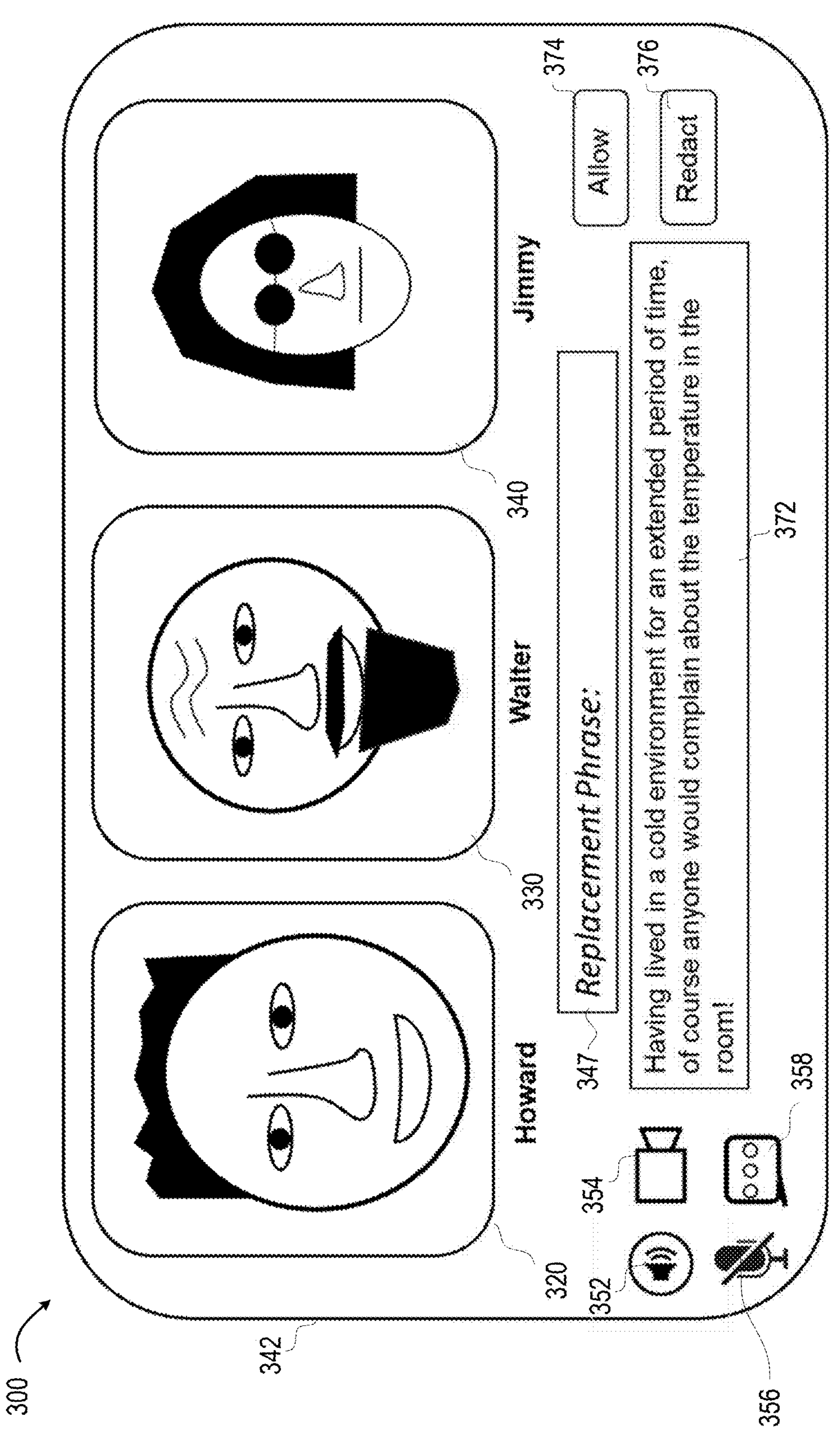
FIG. 3C illustrates an example user interface for contextual reference replacement or deletion, according to one or more embodiments.

FIG. 3C illustrates an example user interface for contextual reference replacement, according to one or more embodiments. The reference numbers in FIG. 3C that match corresponding reference numbers in FIG. 3B refer to similar elements. The example shown in FIG. 3C is a continuation from the example shown in FIG. 3B. An indication 347 is rendered and presented on the display 302 that indicates that a replacement phrase that will replace the contextual reference associated with Kim, has been created. A text field 372 shows the replacement contextual reference that has been anonymized. As an example, the specific location '*Antarctica*' (sentence 251 of FIG. 2B) is replaced with a more generic 'cold environment.' Additionally, the specific time period of '3 years' (sentence 251 of FIG. 2B) is replaced with a more generic 'extended period.' Moreover, the female pronoun 'she' (sentence 251 of FIG. 2B) is replaced with a more generic 'anyone.' In this way, the overall sentiment is still conveyed, but specific details that could easily identify a DNR participant are omitted from the recording. An option 374 is provided that, when invoked, enables the DNR participant (Kim) to allow the replacement contextual reference to be recorded. An option 376, when invoked, enables the DNR participant (Kim) to reject the replacement contextual reference, and instead redact the original contextual reference from recordings and/or transcripts. In this way, the DNR participant retains some control over what is recorded that could reference or reveal the participant's unrecorded speech, thereby improving overall privacy capabilities when recording virtual meetings and/or associated transcripts.

In one or more embodiments, a portion of a contextual reference may be allowed, while another portion of a contextual reference may be redacted. As an example, if Howard stated "Jimmy said that Chuck did a good job on the Jones project. However, he blames Chuck for not anticipating the setbacks on the Smith project." In one or more embodiments, sentiment analysis may be used to determine that the first sentence, including 'Chuck did a good a job' has a positive sentiment, while the second sentence, including blaming Chuck, has a negative sentiment. Accordingly, disclosed embodiments may split a contextual reference into fragments based on sentiment, and redact or allow fragments based on the sentiment. In one or more embodiments, positive sentiment fragments can be recorded while negative sentiment fragments can be redacted.

Figure 4:
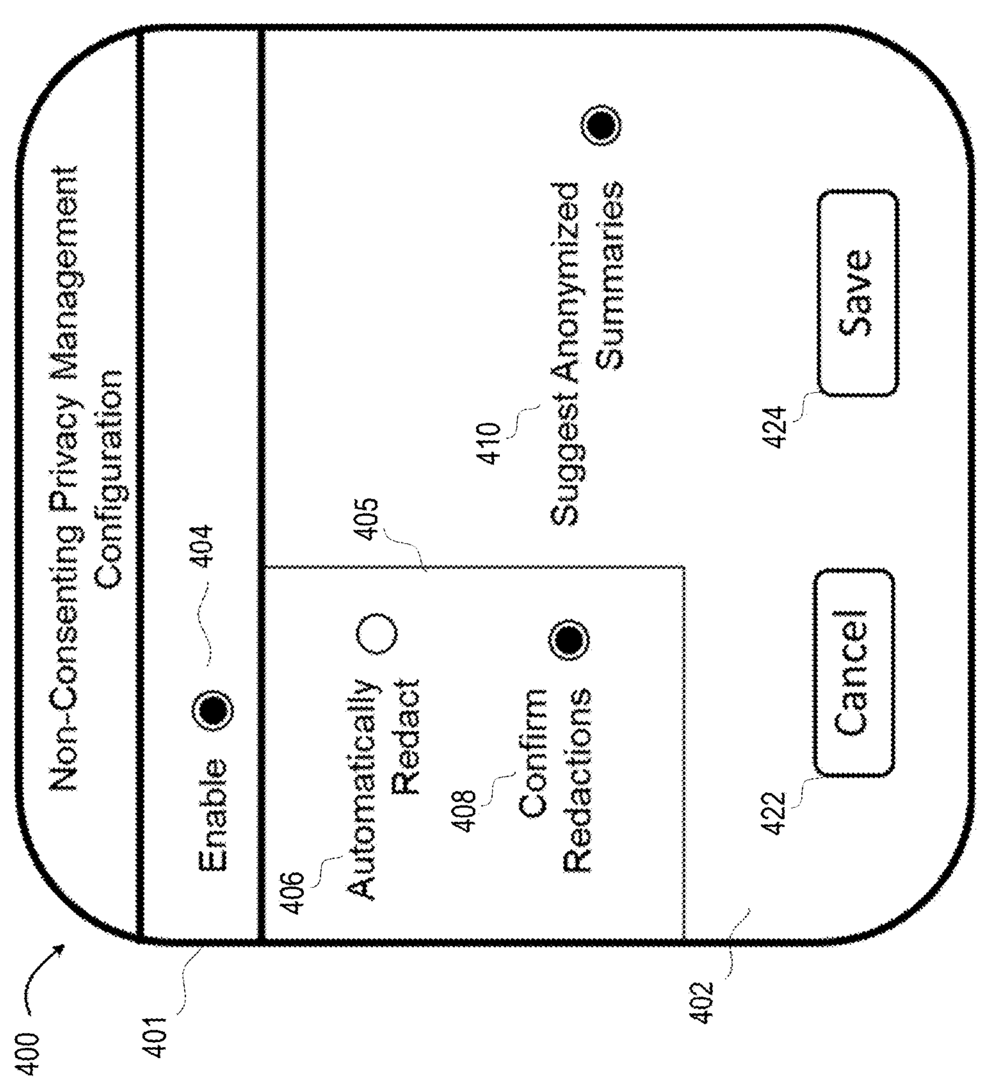
FIG. 4 is an example of a user interface showing non-consenting privacy management configuration, according to one or more embodiments.

FIG. 4 is an example of a user interface showing non-consenting privacy management configuration, according to one or more embodiments. Device 400 may be similar to electronic device 100 depicted in FIG. 1A. Device 400 includes display 402. The user interface 401 can include a control 404 for enabling the non-consenting privacy management features of disclosed embodiments. The user interface can include a redaction configuration section 405. The redaction configuration section 405 can include an option 406 to automatically redact contextual references that are identified as referring to something stated by a participant having a DNR status. Moreover, the configuration section 405 can include an option 408 to enable manual control of the redaction of contextual references that are identified as being associated with a participant having a DNR status. When option 408 is selected (as shown in FIG. 4), the electronic device corresponding to the DNR participant is configured to monitor for when a contextual reference pertaining to a DNR participant is detected. The electronic device may render and present a user interface, such as depicted in FIG. 3B, that includes at least an allow option (364 of FIG. 3B) and a redact option (366 of FIG. 3B).

The user interface 401 can include a suggest anonymized summaries option 410. When anonymized summaries option 410 is selected (as shown in FIG. 4), the electronic device corresponding to the DNR participant is configured to monitor for when a contextual reference pertaining to a DNR participant is detected. The electronic device may render and present a user interface such as depicted in FIG. 3B, that includes at least a replace option (368 of FIG. 3B). A cancel option 422, when invoked, discards unsaved settings of the user interface of FIG. 4, and exits the user interface. A save option 424, when invoked, saves the settings of the user interface of FIG. 4 to memory, and exits the user interface. In one or more embodiments, each DNR participant may be able to establish the options shown in FIG. 4 for associated contextual references. In some embodiments, when a contextual reference is determined to relate to multiple DNR participants, the contextual reference may be automatically redacted, regardless of the setting in redaction configuration section 405. One or more embodiments can include rendering and presenting a configuration user interface on the display, wherein the configuration user interface enables selection of a user setting to suppress non-consented contextual references.

Figure 5:
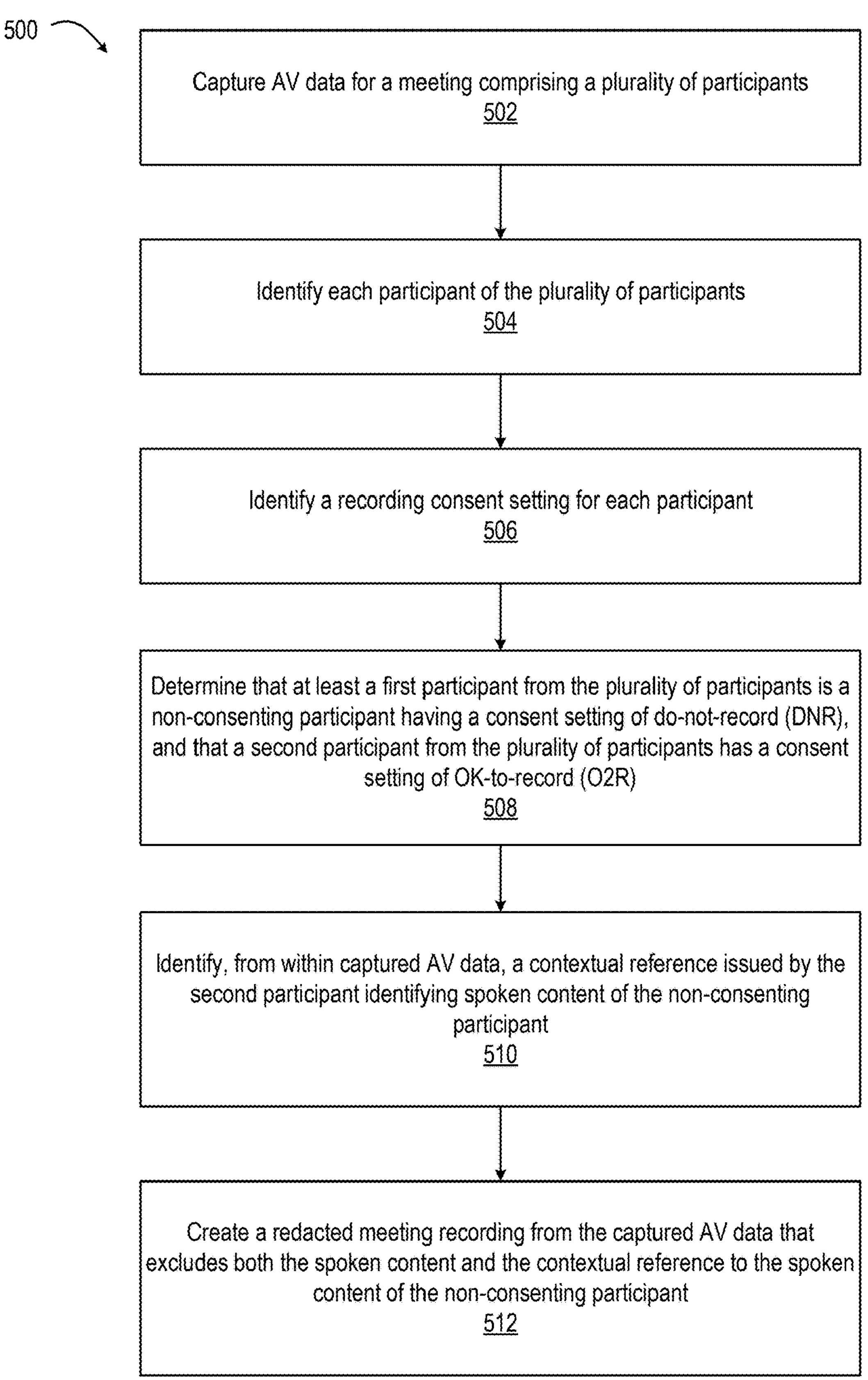
FIG. 5 depicts a flowchart of a computer-implemented method for omitting references about a non-consenting participant speech, according to one or more embodiments.
Figure 6:
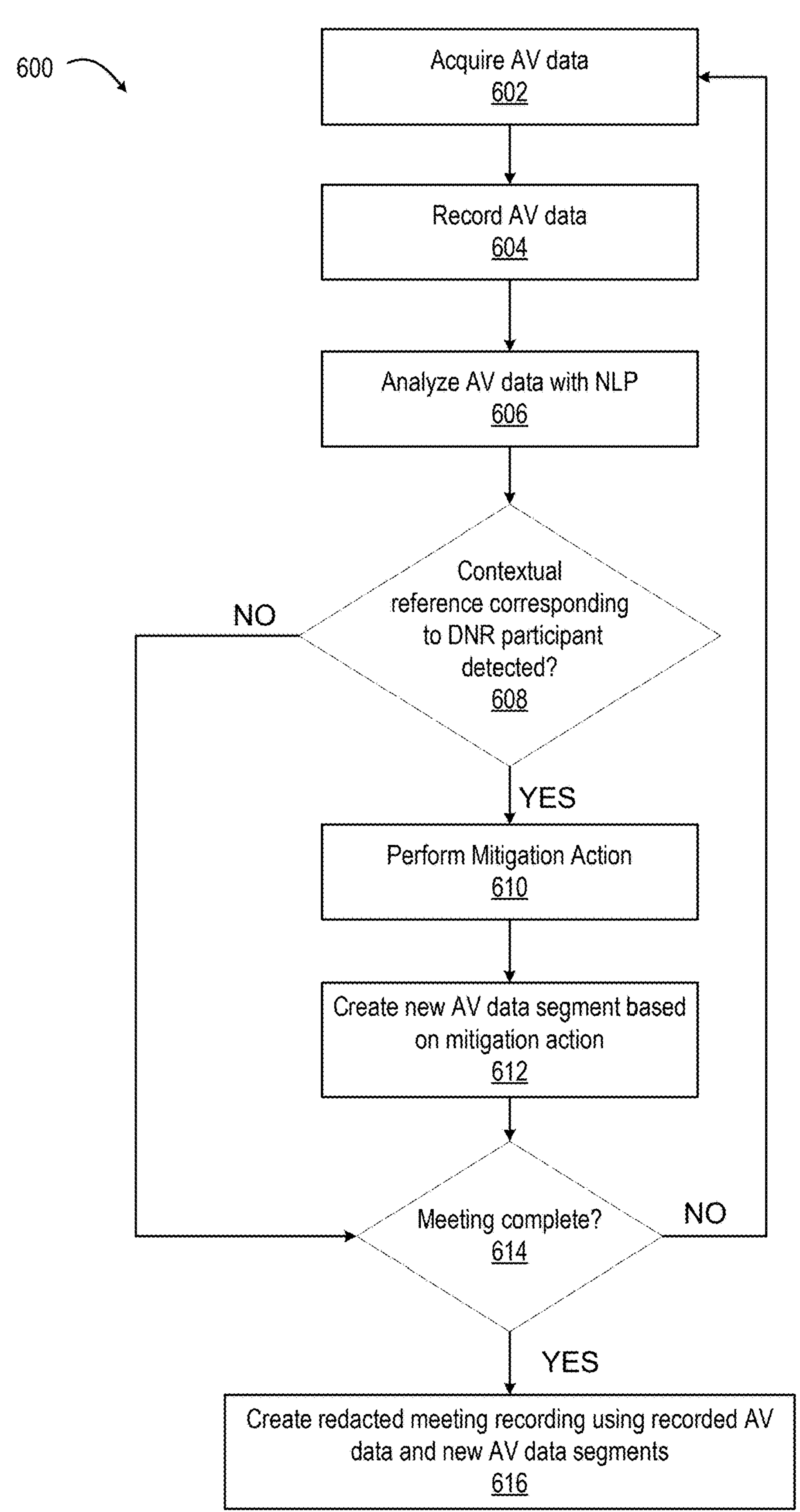
FIG. 6 depicts a flowchart of a computer-implemented method for creating redacted meeting recordings, according to one or more embodiments.

Referring now to the flowcharts presented by FIG. 5-FIG. 6, the descriptions of the methods in FIG. 5-FIG. 6 are provided with general reference to the specific components and features illustrated within the preceding FIGS. 1-4. Specific components referenced in the methods of FIG. 5-FIG. 6 may be identical or similar to components of the same name used in describing preceding FIGS. 1-4. In one or more embodiments, processor 112 (FIG. 1A) configures electronic device 100 (FIG. 1A) to provide the described functionality of the methods of FIG. 5-FIG. 6 by executing program code for one or more modules or applications provided within system memory 120 of electronic device 100, including Recording Privacy Management (RPM) module 125.

FIG. 5 depicts a flowchart of a computer-implemented method for omitting references about non-consenting participant speech, according to one or more embodiments. The method 500 starts at block 502, where AV data is captured for a meeting comprising a plurality of participants. The AV data can be captured by a camera and microphone that is integrated into an electronic device corresponding to a participant (e.g., a meeting participant). In some embodiments, at least some of the AV data may be captured by an external camera and microphone (e.g., a camera and microphone located in a conference room). The method 500 continues to block 504 where each participant of the plurality of participants is identified. In one or more embodiments, at least some of the participants may be identified via meeting login credentials. As an example, when a user logs in to a meeting, the user provides credentials that identify the user. The method 500 continues to block 506, where a recording consent setting for each participant is identified. The user may further establish recording preferences, including a record consent setting, such as OK-to-record (O2R), or do-not-record (DNR).

In one or more embodiments, facial recognition may be used to identify participants. An example use case is when multiple participants are located in a common area such as a conference room, and are being recorded by a common recording device, such as a conference room camera. In the case of multiple participants located in a common area, one or more embodiments may utilize facial recognition to identify a participant that has not signed in to the conference, and accordingly, is operating in 'guest mode.' In the case of a guest mode participant, one or more embodiments may include searching a database, such as a company employee database, to determine if a recording preference for the guest mode participant is available. If a recording preference for the guest mode participant is available, and the recording preference includes a consent setting of DNR, then the aforementioned contextual reference procedures are applied to the guest mode participant. Such a scenario can occur when multiple employees gather in a conference room to conduct a meeting. Some participants may not sign in to the conference system. However, if the participants are employees and have a profile stored in the database, the recording preference of those employees may be obtained, even when the participants are participating in the conference in guest mode. In one or more embodiments, consent settings of guest mode participants can be obtained, and contextual references that relate to guest mode participants that have a consent setting of DNR can be redacted, obfuscated, or anonymized.

The method 500 continues to block 508, where a determination is made that at least a first participant from the plurality of participants is a non-consenting participant having a consent setting of do-not-record (DNR), and that a second participant from the plurality of participants has a consent setting of OK-to-record (O2R). Thus, when the plurality of participants has varied record consent settings, with one or more participants having a DNR setting, and one or more participants having an O2R setting, the disclosed embodiments identify contextual references spoken by an O2R participant that reveal phrases stated by a DNR participant, and can redact, obfuscate, and/or anonymize those contextual references. The method 500 continues to block 510, where from within captured AV data, a contextual reference issued by the second participant identifying spoken content of the non-consenting participant, is identified and redacted. As an example, if a recorded participant mentions, "As Sarah said earlier . . . " and Sarah has a consent setting of DNR, that portion of the dialogue would be redacted, preventing identification.

The method 500 continues to block 512 where a redacted meeting recording is created from the captured AV data that excludes both the spoken content and the contextual reference to the spoken content of the non-consenting participant. The elimination of contextual references can include muting audio, removing phrases from a transcript, obfuscating video (e.g., via blurring, pixelation, etc.), and/or anonymizing contextual references. In this way, improvement in the protection of privacy of meeting participants is achieved.

FIG. 6 depicts a flowchart of a computer-implemented method for creating redacted meeting recordings, according to one or more embodiments. The method 600 starts at block 602, where AV data is acquired. The AV data can include audio data, and/or video data. The audio data can include data recorded in a wav format, or other suitable format. The method 600 continues to block 604, where the AV data is recorded. The AV data can be recorded on a disk drive, flash drive, stored in memory, and/or other suitable storage mechanism. The method 600 continues to block 606, where the AV data is analyzed with natural language processing (NLP) techniques. The NLP techniques can include tokenization, lemmatization, part-of-speech tagging, named entity recognition (NER), sentiment analysis, text summarization, text classification, topic modeling, language modeling, text generation, speech-to-text, text-to-speech, and/or other techniques to identify contextual references. The method 600 continues to block 608 where a determination is made whether a contextual reference corresponding to a phrase spoken by a DNR participant is detected. If, at block 608, it is determined that a contextual reference corresponding to a DNR participant is detected, then the method 600 continues to block 610, where a mitigation action is performed. In one or more embodiments, the mitigation action can include one of redacting, allowing, obfuscating, or anonymizing the content. In one or more embodiments, the performing of the mitigation action includes altering the AV recording and/or transcript of a meeting to redact, obfuscate, and/or anonymize one or more contextual references that pertain to DNR participants. The method 600 continues to block 612, where a new AV data segment is created based on the mitigation action. The new AV data segment can be used as a replacement for an original AV data segment covering the same time period. In one or more embodiments, the new AV data segment is a redacted, obfuscated, and/or anonymized version of an original AV data segment acquired at block 602. The method 600 continues to block 614 where a check is made to determine if the meeting is complete. If, at block 614, it is determined that the meeting is complete, then the method 600 continues to block 616 where a redacted meeting recording is created based on recorded AV data and new AV data segments.

In one or more embodiments, the redaction processing can occur as a post-processing operation. That is, the redaction processing can occur after the meeting concluded, and the original recording and transcript that were acquired during the meeting are processed to remove, redact, or obfuscate contextual references that refer to spoken phrases of DNR participants.

Returning to the flow chart, if, at block 608, it is determined that a contextual reference corresponding to a DNR participant is not detected, then the method 600 continues to block 614. If, at block 614, it is determined that the meeting is not complete, then the method 600 returns back to block 602 to acquire more AV data.

As can now be appreciated, disclosed embodiments provide techniques for preventing the recording of a subset of participants in a meeting by allowing them to opt out by setting a do-not-record (DNR) status. Thus, disclosed embodiments offer significant benefits for privacy and inclusivity. This functionality not only protects sensitive individuals but also introduces a higher standard of privacy for the meeting participants. By allowing individuals to opt out of being recorded, participants can engage more openly without fear of having their likeness, voice, and/or statements preserved in the meeting record. Moreover, the automatic redaction of contextual references that could identify phrases spoken by DNR participants ensures comprehensive privacy protection. This feature minimizes the risk of accidental exposure of the phrases spoken by DNR participants through remarks made by other participants. Disclosed embodiments encourage inclusivity by accommodating participants with diverse privacy needs. When DNR participants know their identity and contributions are protected, DNR participants may feel more comfortable sharing valuable insights and/or participating in discussions they would otherwise avoid. For organizations, disclosed embodiments maintain a balance between recording meetings for accountability or documentation and respecting the privacy rights of individuals. Thus, disclosed embodiments not only safeguard individuals who opt out of recording, but also elevate privacy standards, benefiting all meeting participants by creating a safer, more respectful digital environment.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined primarily by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
- a communications subsystem enabling the electronic device to communicatively connect to at least one second electronic device;
- a memory having stored thereon a recording privacy management (RPM) module; and
- at least one processor coupled to the communications subsystem and the memory and which processes program code of the RPM module, the at least one processor configured to cause the electronic device to:
  - capture audio/video (AV) data for a meeting comprising a plurality of participants;
  - identify each participant of the plurality of participants;
  - identify a recording consent setting for each participant among the plurality of participants;
  - determine that at least a first participant from the plurality of participants is a non-consenting participant having a consent setting of do-not-record (DNR), and that a second participant from the plurality of participants has a consent setting of OK-to-record (O2R);
  - identify, from within captured AV data, a contextual reference issued by the second participant, wherein the contextual reference identifies spoken content of the non-consenting participant; and
  - create a redacted meeting recording from the captured AV data that excludes both the spoken content and the contextual reference to the spoken content of the non-consenting participant.

2. The electronic device of claim 1, wherein to identify the contextual reference to spoken content of the non-consenting participant, the at least one processor is further configured to:
- identify a first phrase from the first participant;
- identify a second phrase from the second participant;
- identify an inference in the second phrase that relates to and reveals one or more aspects of the first phrase attributable to the first participant; and
- identify the second phrase as a non-consenting participant reference, based on the inference.

3. The electronic device of claim 2, wherein to identify the inference, the at least one processor is further configured to identify within the second phrase, at least one identifying feature of the first participant from among identifying features comprising a name of the first participant, and a job title of the first participant.

4. The electronic device of claim 1, wherein the at least one processor is further configured to create a transcript based on the redacted meeting recording.

5. The electronic device of claim 1, wherein to create the redacted meeting recording, the at least one processor is configured to:
- identify one or more video images within the AV data that correspond to lips of the first participant providing spoken content and lips of a second participant providing a contextual reference to the spoken content; and
- apply an obfuscation effect to the lips of the first participant and of the second participant in each of the one or more video images, to prevent lip-reading of the spoken content related to the contextual reference.

6. The electronic device of claim 1, further comprising:
a display;
a camera; and
a microphone;
wherein the at least one processor is communicatively coupled to the display, the camera, and the microphone and is configured to cause the electronic device to capture at least a portion of the AV data via the camera and the microphone during a video call.

7. The electronic device of claim 6, wherein the at least one processor is further configured to, in response to identifying a contextual reference, render and present a redaction notification on the display.

8. The electronic device of claim 7, wherein the at least one processor is further configured to perform a mitigation action in response to identifying the contextual reference, wherein the mitigation action comprises at least one of, skipping/omitting of the contextual reference, surfacing a contextual reference notification that includes an option to allow or remove the contextual reference, and creating an anonymized summary of a portion of the AV data to remove identifying aspects of the contextual reference and replacing the contextual reference with the anonymized summary.

9. The electronic device of claim 7, wherein the at least one processor is further configured to render and present a configuration user interface on the display, wherein the configuration user interface enables selection of a user setting to suppress non-consented contextual references.

10. A method comprising:
capturing, on an electronic device, audio/video (AV) data for a meeting comprising a plurality of participants;
identifying each participant of the plurality of participants;
identifying a recording consent setting for each participant among the plurality of participants;
determining that at least a first participant from the plurality of participants is a non-consenting participant having a consent setting of do-not-record (DNR), and that a second participant from the plurality of participants has a consent setting of OK-to-record (O2R);
identifying, from within captured AV data, a contextual reference issued by the second participant, wherein the contextual reference identifies spoken content of the non-consenting participant; and
creating a redacted meeting recording from the captured AV data that excludes both the spoken content and the contextual reference to the spoken content of the non-consenting participant.

11. The method of claim 10, further comprising:
identifying a first phrase from the first participant;
identifying a second phrase from the second participant;
identifying an inference in the second phrase that relates to and reveals one or more aspects of the first phrase attributable to the first participant; and
identifying the second phrase as a non-consenting participant reference, based on the inference.

12. The method of claim 11, further comprising identifying within the second phrase, at least one identifying feature of the first participant from among identifying features comprising a name of the first participant, and a job title of the first participant.

13. The method of claim 10, further comprising creating a transcript based on the redacted meeting recording.

14. The method of claim 10, further comprising:
identifying one or more video images within the AV data that correspond to lips of the first participant providing spoken content and lips of a second participant providing a contextual reference to the spoken content; and
applying an obfuscation effect to the lips of the first participant and of the second participant in each of the one or more video images, to prevent lip-reading of the spoken content related to the contextual reference.

15. The method of claim 10, wherein the electronic device further comprises a display, a camera, and a microphone, and wherein the capturing of AV data comprises capturing at least a portion of the AV data via the camera and the microphone during a video call.

16. The method of claim 15, further comprising rendering and presenting a redaction notification on the display.

17. The method of claim 16, further comprising performing a mitigation action in response to identifying the contextual reference, wherein the mitigation action comprises at least one of, skipping/omitting of the contextual reference, surfacing a contextual reference notification that includes an option to allow or remove the contextual reference, and creating an anonymized summary of a portion of the AV data to remove identifying aspects of the contextual reference and replacing the contextual reference with the anonymized summary.

18. The method of claim 17, further comprising rendering and presenting a configuration user interface on the display, wherein the configuration user interface enables selection of a user setting to suppress non-consented contextual references.

19. A computer program product comprising a non-transitory computer readable medium having program instructions that when executed by a processor of an electronic device comprising a display, configure the electronic device to perform functions comprising:
capturing audio/video (AV) data for a meeting comprising a plurality of participants;
identifying each participant of the plurality of participants;
identifying a recording consent setting for each participant among the plurality of participants;
determining that at least a first participant from the plurality of participants is a non-consenting participant having a consent setting of do-not-record (DNR), and that a second participant from the plurality of participants has a consent setting of OK-to-record (O2R);
identifying, from within captured AV data, a contextual reference issued by the second participant, wherein the contextual reference identifies spoken content of the non-consenting participant; and
creating a redacted meeting recording from the captured AV data that excludes both the spoken content and the contextual reference to the spoken content of the non-consenting participant.

20. The computer program product of claim 19, further comprising program instructions for:
identifying a first phrase from the first participant;
identifying a second phrase from the second participant;
identifying an inference in the second phrase that relates to and reveals one or more aspects of the first phrase attributable to the first participant; and
identifying the second phrase as a non-consenting participant reference, based on the inference.

* * * * *